Figure 1:
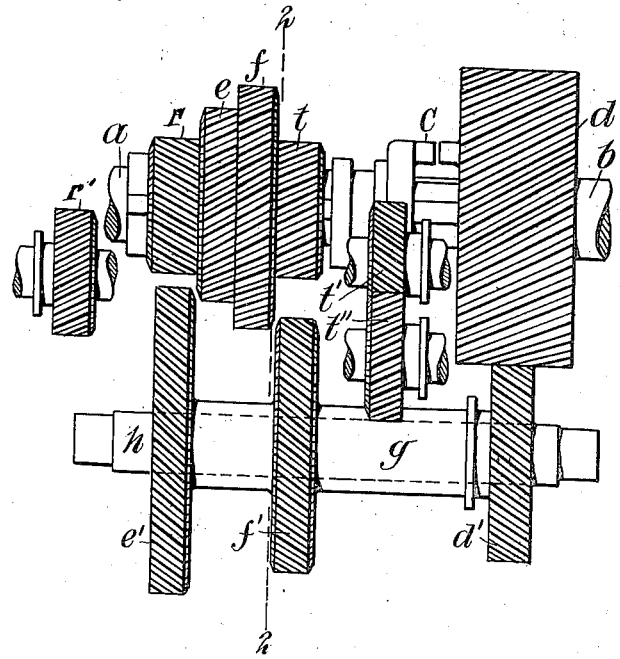

A. AICHELE.
CHANGE SPEED GEARING.
APPLICATION FILED MAY 31, 1917.

1,299,094.

Patented Apr. 1, 1919.
2 SHEETS—SHEET 1.

INVENTOR
Albert Aichele
BY
ATTORNEY

A. AICHELE.
CHANGE SPEED GEARING.
APPLICATION FILED MAY 31, 1917.

1,299,094.

Patented Apr. 1, 1919.
2 SHEETS—SHEET 2.

INVENTOR
Albert Aichele
BY
C. W. Fairbanks
ATTORNEY

UNITED STATES PATENT OFFICE.

ALBERT AICHELE, OF BADEN, SWITZERLAND.

CHANGE-SPEED GEARING.

1,299,094. Specification of Letters Patent. Patented Apr. 1, 1919.

Application filed May 31, 1917. Serial No. 171,820.

*To all whom it may concern:*

Be it known that I, ALBERT AICHELE, a citizen of Switzerland, and a resident of Baden, in Switzerland, have invented certain new and useful Improvements in Change-Speed Gearings, of which the following is a specification.

This invention relates to certain improvements in the general type of construction shown in my prior Patent No. 1,188,528, issued June 27th, 1916, (reissued May 1st, 1917, No. 14,293) and in my co-pending application Serial No. 171,819, filed May 31st, 1917.

In my prior patent, I have shown a change gear comprising driving, driven and counter-shafts, there being two or more gear wheels on the counter-shaft and axially movable together, one meshing with a gear on the driving shaft and the other meshing with the gear on the driven shaft, and all of the gears having their teeth so inclined that the axial thrust on one gear on the counter-shaft compensates for the opposite axial thrust on another gear on the counter-shaft.

The construction there illustrated permits of only three forward speeds for each counter-shaft and its plurality of gears, the three speeds being secured by a movement of a sleeve toward the right or toward the left from a neutral position, or the direct coupling of the driving and driven shafts. If a larger number of speeds are desired, it would be necessary to add a second counter-shaft with its plurality of gears to give four or five forward speeds.

The main object of my present invention is to utilize the main features of the construction shown in my prior patent but at the same time secure four or more speeds with the use of but one counter or transmission shaft and its plurality of directly connected, axially movable gears.

In my present invention, I provide a plurality of auxiliary gears having a predetermined inter-relationship and bodily movable into such position that one meshes with a gear on the counter-shaft and another with a gear on one of the two main shafts so that power is transmitted through said auxiliary gears. The mechanism for effecting the bodily movement of these auxiliary gears and the direction of such movement constitutes no portion of my invention. The gears may be moved by any suitable means and in any desired direction to bring them into or out of operative position.

It will be evident that more than a single auxiliary gear of this character is necessary as one alone would give reverse, rather than forward, rotation. It will also be evident that if only two intermeshing gears are used, their diameters are of no consequence so far as the speed transmission is concerned, the ratio being dependent upon the diameters of the gears on the counter-shaft and the main shafts.

By the aid of three intermediate gears mounted on two parallel axes, it is possible to secure any desired ratio of speed transmission between the main shaft and the counter-shaft without being dependent solely on the relative diameters of the gears on said shafts. Such arrangement of three intermediate gears on two parallel axes has the further advantage of permitting the use of one less gear on the main shaft and the minimizing of the rotation mass of this shaft.

Figure 3:
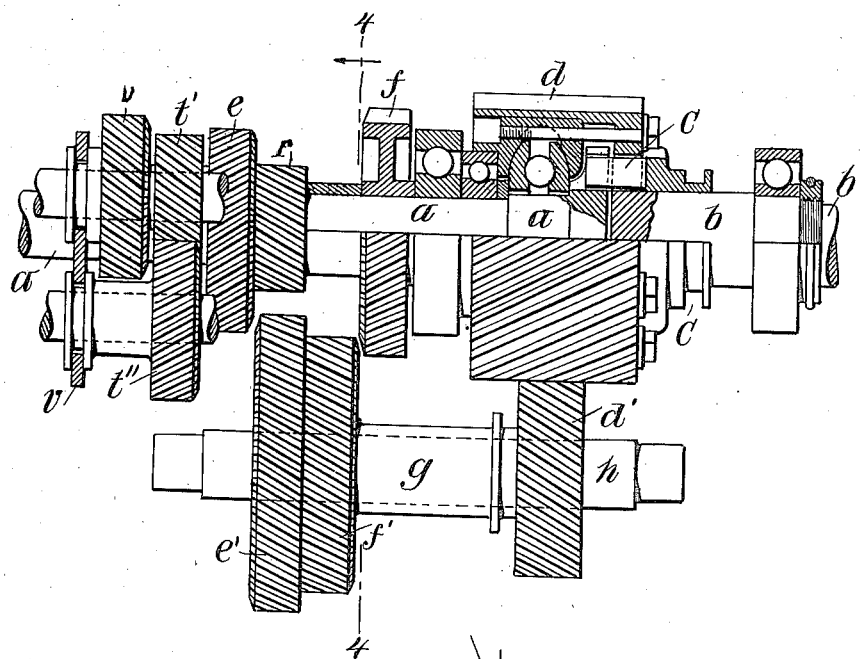
Figure 4:
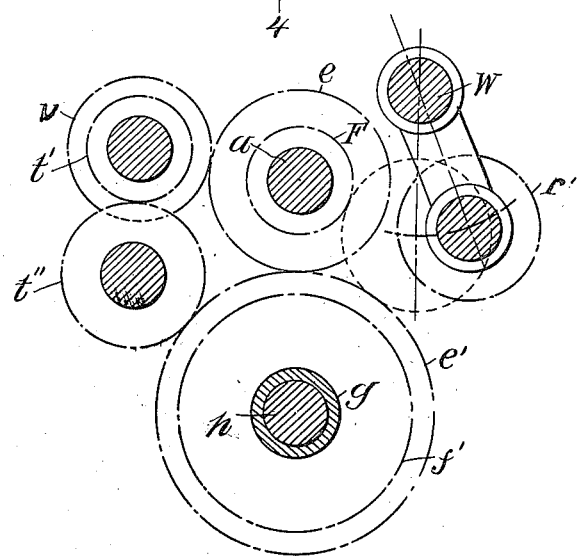

Reference is to be had to the accompanying drawings, in which I have illustrated two embodiments of my invention although I wish it particularly understood that various other forms may be readily designed within the spirit of my invention, without departing from the scope of the appended claims. In these drawings, in which similar reference characters indicate corresponding parts in the several views, Figure 1 is a plan view of one construction, Fig. 2 is a rather diagrammatic cross-section showing the intermediate gears in position, Fig. 3 is a plan view of a further form, a portion thereof being broken away, and Fig. 4 is a rather diagrammatic cross-section of the construction illustrated in Fig. 3.

Figure 2:
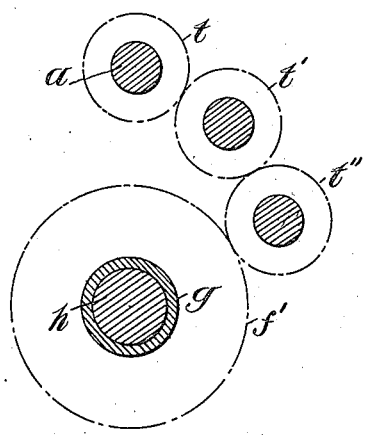

In the form illustrated in Figs. 1 and 2, two main shafts $a$ and $b$ are mounted in alinement with each other, one of them constituting the driving and the other the driven shaft. Either may serve either purpose, although for the purpose of definiteness of description, I will refer to the shaft $a$ as the driving or motor shaft and the shaft $b$ as the driven or propeller shaft.

The driving shaft $a$ has rigidly secured thereto a series of gears $r$, $e$, $f$ and $t$, while the driven shaft has a broad gear $d$. A coupling $c$ of any suitable form may be provided for directly connecting the shafts $a$ and $b$ for the highest or fourth speed. Parallel to the main shaft is a counter-shaft $h$ having a sleeve $g$ slidable axially either together with the counter-shaft $h$ or in respect thereto. The sleeve may be keyed to prevent relative rotation of the countershaft and sleeve, or may be freely rotatable thereon and the shaft $h$, if desired, may be held against rotation by suitable supports. The sleeve carries gears $e'$, $f'$ and $d'$, the latter being permanently in mesh with the gear $d$ on the driven shaft and the gears $e'$ and $f'$ being movable into or out of mesh with the gears $e$ and $f$ respectively of the driving shaft by the proper axial movement of the rigidly connected gears $e'$, $f'$ and $d'$. All of these gears have their teeth inclined or helically disposed so that the axial thrust on the gear $d'$ is compensated for, or neutralized by, the axial thrust on the other pair of intermeshing gears, whether they be $e$ and $e'$ or $f$ and $f'$.

When the gears $e'$ and $f'$ of the countershaft are out of mesh with the corresponding gears $e$ and $f$ on the driving shaft, the gear $e'$ will lie in the same plane as the gear $r$ on the driving shaft. An intermediate gear $r'$ is so mounted that it may then be moved into mesh with both the gears $e'$ and $r$ to give reverse rotation. It will be noted that the gear $r$ has its teeth inclined in the opposite direction to those of the gears $e$ and $f$.

This construction thus far described in detail may be identical with that shown in my prior patent.

As the important feature of my present invention, I provide means whereby power may be transmitted from the driving shaft $a$ to one of the gears of the counter-shaft at a different ratio than those resulting from the meshing of the gears $e$, $e'$, or $f$, $f'$. In the specific form illustrated in Figs. 1 and 2, I provide two intermediate gears $t'$, $t''$ and provide the driving shaft with a gear $t$. The latter is so placed as to lie in the same plane with the gear $f'$ when the latter is out of mesh with the gear $f$ and the two gears $t'$, $t''$, are mounted on parallel axes so as to remain permanently in mesh with each other and to move together until the gear $t'$ comes into mesh with the gear $t$ and the gear $t''$ comes into mesh with the gear $f'$. This movement may involve the sliding of the two gears $t'$ and $t''$ on their shafts or with them in an axial direction although the two may be mounted in any other manner, to permit them to move into and out of operative position.

As previously pointed out, the size of these gears is immaterial, the gear transmission ratio being determined by the diameters of the gears $t$ and $f'$. The gear $t$ is preferably smaller than the gears $e$ or $f$ so that the gears $t'$, $t''$, may be brought into operation for the lowest or starting speed and may be brought entirely out of mesh and remain stationary while the vehicle is driven at second, third, direct or reverse speeds. The intermeshing of these gears $t'$, $t''$ with each other and each with a third, entirely eliminates or equalizes any axial thrust on the gears $t'$, $t''$ and there is no axial thrust on the sleeve $g$.

In the form shown in Figs. 3 and 4, it is possible to secure four speeds by the use of a single counter-shaft, but I employ three auxiliary intermediate gears $t'$, $t''$, and $u$, in order to attain the first or lowest speed. By this arrangement, it is possible for me to entirely eliminate the gear corresponding to the gear $t$ of Figs. 1 and 2. The gears $t'$ and $u$ are rigidly connected and rotate about the same axes, the gear $t''$ being constantly in mesh with the gear $t'$ and rotatable about a separate axis. The shifting mechanism as for instance a lever fork $v$, is such that all three of the intermediate gears travel together. The movement is shown as an axial one although any other bodily movement of the three gears as a whole may be employed. The gear $u$ will mesh with the gear $e$ at a time when $e$ and $e'$ are out of mesh, as shown in Fig. 3.

With these auxiliary gears in mesh, the power will be transmitted from $e$ to $e'$ but at a different speed ratio than is given when these two are directly in mesh with each other. This is due to the fact that the gear $u$ does not mesh with the gear $t''$ but is rigidly secured to the gear $t'$ which does mesh with the gear $t''$. The number of revolutions of the transmission sleeve $g$ is equal to that of the shaft $a$ multiplied by the expression $$\frac{t' \cdot e}{e' \cdot u}$$

in which the designations of the gears represent the size of their pitch circle diameters. The gear $t'$ serves only as an intermediate gear but is necessary in order to maintain the correct rotative direction.

As the gears $e$ and $e'$ are brought into engagement to give the second speed, the inclination of their teeth must be the same. The intermediate gears $u$, $t'$, $t''$, must also have the same tooth angle so that they may be properly meshed for the first speed. As the gears $t'$ and $u$ have different diameters, the requirement that the tangents of the tooth angles be of the same ratio as the gear diameters to give a proper axial thrust compensation, is not fulfilled. The axial thrust may be taken up by other means, which is common and well known.

In Figs. 3 and 4, I have illustrated certain other construction details which are independent of the main features of my invention above referred to, but which are of more or less importance. The reverse gear $r'$ is here shown as carried by a link mounted to swing about an axis $w$ to bring it into or out of mesh with the gears $r$ and $e'$.

It will be noted that the gear $e'$ serves three purposes. When directly engaged with the gear $e$, it gives the second speed; when it engages with the gear $t''$, it gives the first speed; and when engaged with the gear $r'$, it gives the reverse.

In order to save space, the broad gear $d$ which is secured to the driven shaft is shown as overlapping the end of the driving shaft and is shown as in the form of a hollow body to contain in its interior the supporting bearing, the thrust bearing and the fixed parts of the coupling $c$. The jaws on the movable part of the coupling $c$ are shown as passing through openings in the wall of the gear $d$ which is in a plane at right angles to the shaft. The clutch is shown in coupled position for the direct drive.

The novel transmission mechanism illustrated can also be used for three gear speeds in a gearing of very short length. If, for instance, in Fig. 3, the gears $f, f'$ are omitted, then the gearing becomes shorter by three gear widths, namely by the full width of the gears $f, f'$ as well as by one-third of the width of the gear $d$.

I have illustrated the intermediate gears $t, t'$ and $u$ so connected and arranged that when gear $t''$ goes out of mesh with the gear $e'$, the gear $u$ will go out of mesh with the gear $e$. This simultaneous disengagement is not essential.

Having thus described my invention, what I claim as new and desire to secure by Letters Patent is:

1. The combination of a driving shaft, a driven shaft, a counter shaft, a toothed gear on said driving shaft, and a pair of rigidly connected toothed gears on said counter shaft bodily movable into and out of power transmitting engagement with said first mentioned toothed gears, the gears on said counter shaft having their teeth inclined in the same general direction and to extents varying with the diameters of said gears, whereby the end thrusts on the toothed gears on said counter shaft are substantially equal and in opposite directions, in combination with a plurality of intermediate gears bodily shiftable together to operative or inoperative position, one of said intermediate gears when in operative position meshing with a gear on the counter-shaft and another of said intermediate gears when in operative position meshing with a gear on one of the other shafts.

2. The combination of a driving shaft, a driven shaft, a counter shaft, a pair of toothed gears, one on said driving shaft and the other on said driven shaft, a pair of toothed gears on said counter shaft, one meshing with one of said first mentioned pairs, a plurality of intermediate gears bearing a predetermined driving relationship to each other, one being adapted to mesh with the other gear on the counter shaft and another of said plurality of gears rotatable about a different axis and being adapted to mesh with the other gear of said first mentioned pair, and means for bringing said plurality of gears into or out of driving position, all of said gears having their teeth so inclined that the end thrusts on the gears on said counter shaft are substantially equal and in opposite directions.

3. A change gear comprising a pair of main shafts, a counter-shaft, a gear on one of said main shafts, a plurality of gears on the other of said main shafts, a plurality of gears on said counter-shaft, and axially movable together to maintain one of them in constant meshing engagement with said first mentioned gear and to bring another of them into or out of engagement with said second mentioned gears, and a plurality of intermediate gears movable to operative or inoperative position to transmit power between said counter-shaft and the second mentioned main shaft, one of said intermediate gears being rotatable about one axis and adapted to engage with the gear on the counter-shaft and another of said intermediate gears being drivingly connected thereto and rotatable about a different axis and adapted to mesh with one of said first mentioned plurality of gears.

4. A change speed gear including a pair of main shafts, a plurality of gears on one of said shafts, a single gear on the other of said shafts, a counter-shaft having a gear meshing with said single gear and having a gear movable axially into mesh with one of said plurality of gears, and a pair of meshing intermediate gears bodily movable to bring one into engagement with the second mentioned gear on the counter-shaft and the other into mesh with one of said plurality of gears.

5. A change speed gear including a pair of main shafts, a plurality of gears on one of said shafts, a single gear on the other of said shafts, a counter-shaft having a gear meshing with said single gear and having a gear movable axially into mesh with one of said plurality of gears, and a pair of intermediate gears rotatable about parallel axes and one serving to drive the other, said intermediate gears being bodily movable to bring one into engagement with the second mentioned gear on the counter-shaft and the other into mesh with one of said plurality of gears.

6. A change speed gear including a pair of main shafts, a plurality of gears on one of said shafts, a single gear on the other of said shafts, a counter-shaft having a gear meshing with said single gear and having a gear movable axially into mesh with one of said plurality of gears, and a pair of meshing intermediate gears bodily movable to bring one into engagement with the second mentioned gear on the counter-shaft and the other into mesh with one of said plurality of gears, all of said gears having their teeth inclined in respect to their axes and in the same ratios as their pitch circle diameters.

7. The combination of a driving shaft, a driven shaft, a counter shaft, a pair of toothed gears, one on said driving shaft and the other on said driven shaft, a pair of toothed gears on said counter shaft, one meshing with one of said first mentioned pairs in combination with three intermediate gears, two of which are rigidly connected and rotatable about the same axis and the other meshing with one of said two and rotatable about a different axis, and means for shifting said intermediate gears to bring one into mesh with the other gear of said first mentioned pair and the other into mesh with the other gear of said second mentioned pair.

Signed at Zurich, Switzerland, this 4 day of May, 1917.

ALBERT AICHELE.